(12) United States Patent
Marason et al.

(10) Patent No.: US 8,933,974 B1
(45) Date of Patent: Jan. 13, 2015

(54) DYNAMIC ACCOMMODATION OF DISPLAY MEDIUM TILT

(71) Applicants: Eric G. Marason, San Francisco, CA (US); William Thomas Weatherford, San Mateo, CA (US); Miguel Virgen, Santa Clara, CA (US)

(72) Inventors: Eric G. Marason, San Francisco, CA (US); William Thomas Weatherford, San Mateo, CA (US); Miguel Virgen, Santa Clara, CA (US)

(73) Assignee: Rawles LLC, Wilmington, DE (US)

( * ) Notice: Subject to any disclaimer, the term of this patent is extended or adjusted under 35 U.S.C. 154(b) by 124 days.

(21) Appl. No.: 13/626,739

(22) Filed: Sep. 25, 2012

(51) Int. Cl.
*G09G 5/10* (2006.01)
*G03B 21/14* (2006.01)

(52) U.S. Cl.
USPC ............................................ 345/690; 353/69

(58) Field of Classification Search
USPC ......................................................... 345/690
See application file for complete search history.

(56) References Cited

U.S. PATENT DOCUMENTS

| | | | |
|---|---|---|---|
| 2006/0290896 A1* | 12/2006 | Nishida | ........................... 353/69 |
| 2011/0221793 A1* | 9/2011 | King et al. | .................... 345/690 |
| 2012/0223885 A1 | 9/2012 | Perez | |
| 2012/0327139 A1* | 12/2012 | Margulis | ...................... 345/690 |

FOREIGN PATENT DOCUMENTS

WO    WO2011088053    7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

Primary Examiner — Charles V Hicks
(74) Attorney, Agent, or Firm — Lee & Hayes, PLLC (57) ABSTRACT

Apparatuses, methods, and computer-readable media for determining a distance and an angle of a display medium with respect to a projector are described herein. Based at least on the determined angle of the display medium, the angle of at least a component of the projector is adjusted. The projector then projects light onto the display medium.

23 Claims, 6 Drawing Sheets

PROJECTED IMAGE WITHOUT
KEYSTONE CORRECTION 502

PROJECTED IMAGE WITH
KEYSTONE CORRECTION 504

DYNAMIC ACCOMMODATION OF DISPLAY MEDIUM TILT

BACKGROUND

A large and growing population of people is enjoying entertainment through consumption of digital content items, such as music, movies, images, books, and so on. Many people today consume digital content through a wide variety of electronic devices. Among these electronic devices are cellular telephones, personal digital assistants (PDAs), electronic book readers, portable media players, tablets, netbooks, and the like. As more content is made available in digital form, people continue to consume more and more of this content. In addition, this population expects digital content to become more and more accessible and ubiquitous.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes an augmented reality functional node (ARFN) that is configured to dynamically accommodate motion and tilt in three-dimensional space of a display medium that a projector of the ARFN projects light onto. The display medium may be, for example, handheld and may change in one or both of its distance from the projection unit or its angle with respect to an optical axis between the projection unit and the display medium.

In response to detecting a change in distance or angle, the ARFN may perform a sequence of actions to accommodate the change. First, the ARFN may adjust a zoom of a lens of the projector to fit a display screen size of the display medium.

Next, the ARFN may adjust an angle of at least a component of the projector with respect to its prior position. The component that is angularly adjusted may be the lens of the projector or the imager and light engine of the projector. The angular adjustment may be in an opposite direction from an angular tilt of the display medium (opposite in three-dimensional space), and the size of the angle created by the adjustment may be relatively small when compared to the determined angle of the display medium with respect to the optical axis. For example, the determined angle of the display medium may be forty-five degrees and the angle created by the adjustment may be one-point-five degrees. The adjustment may be based on one or both of the determined distance and/or the determined angle of the display medium. The ARFN may calculate the adjustment based on the formula $\mathrm{Tan}(A)=(-1/M)\mathrm{Tan}(B)$, wherein A is the angle created by the adjustment, M is an image magnification of the projector, and B is the determined angle of the display medium. In some embodiments, the adjustment may be effectuated through use of actuators located between the lens and other components of the projector (i.e., the imager and light engine of the projector). Motion of these actuators causes the angular adjustment of the component of the projector with respect to its previous position.

The ARFN may then readjust the zoom of the lens to accommodate any change in distance caused by the angular adjustment of the component of the projector.

In some embodiments, the ARFN may then correct an anticipated keystone distortion of an image to be projected, the correcting being based at least in part on one or both of the determined angle or the adjusted angle and including stretching the to-be-compressed pixels in the image and compressing the to-be-stretched pixels in the image.

Further, the projector of the ARFN may also project light onto the display medium. The projector may project the light before, during, and/or after the dynamic accommodation of the detected change in distance and/or angle of the display medium.

In various embodiments, both the detecting and the dynamic accommodation may occur periodically or continuously. If periodically, the magnitude of the period may be based on a history of movement of the display medium.

This brief introduction is provided for the reader's convenience and is not intended to limit the scope of the claims, nor the proceeding sections. Furthermore, the techniques described in detail below may be implemented in a number of ways and in a number of contexts. One example implementation and context is provided with reference to the following figures, as described below in more detail. It is to be appreciated, however, that the following implementation and context is but one of many.

Example Environment

Figure 1:
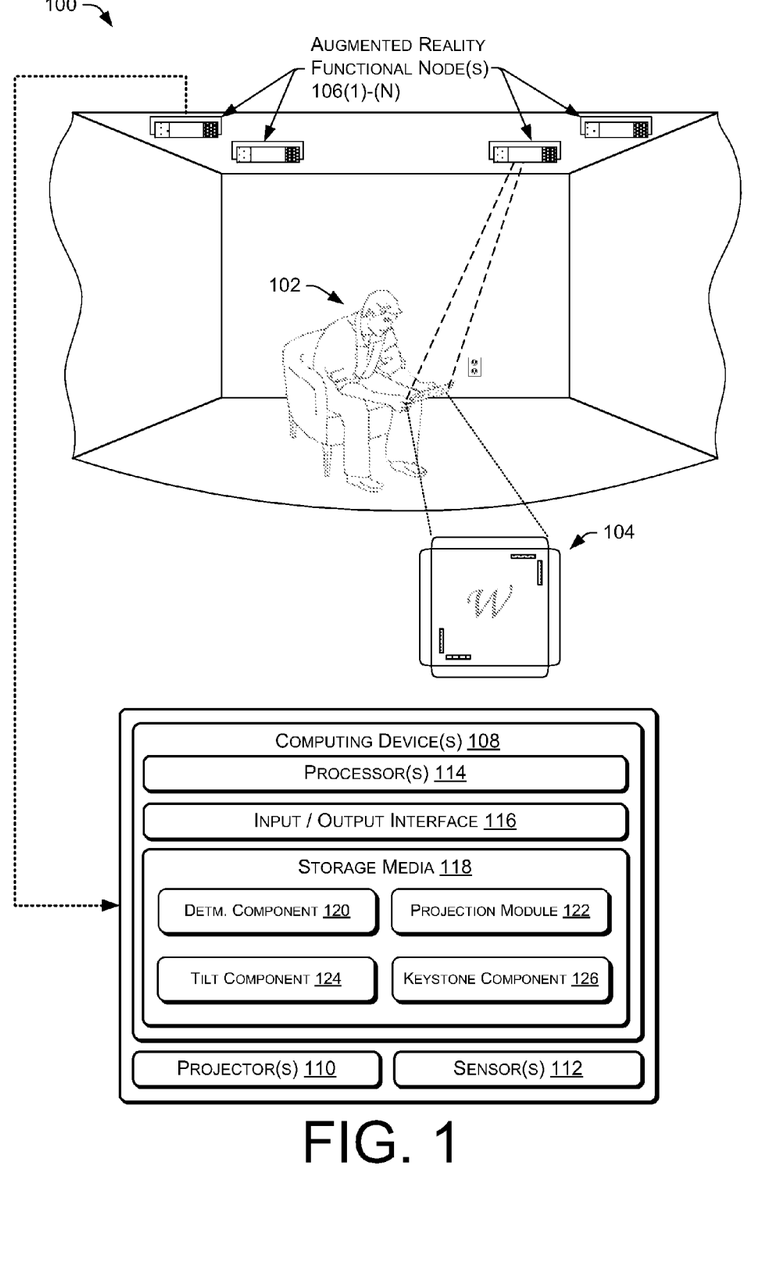
FIG. 1 illustrates an example environment that includes an augmented reality functional node (ARFN) configured to project content onto a display medium.

FIG. 1 illustrates an example environment 100 in which a user 102 consumes content that is projected onto a display medium 104 by one or more augmented reality functional nodes (ARFNs) 106(1), ..., 106(N) (collectively referred to as "the ARFN 106" in some instances). It is to be appreciated that the techniques described herein may be performed by a single ARFN, by a collection of any number of ARFNs, or by any other devices or combinations of devices. The projected content may include electronic books, videos, images, interactive menus, or any other sort of visual and/or audible content.

In the example environment 100, the ARFN 106 is located in a ceiling of a room. However, the ARFN 106 may be located in other locations, such as on a table next to the user 102, in a wall, on a floor, and so on. Further, in some instances the ARFN 106 may be located in and/or integral with an object, such as a lamp, chair, and so on. Moreover, although the ARFN 106 is orientated in the environment 100 to project content from an elevated position with respect to the user 102, the ARFN 106 may alternatively, or additionally, be orientated differently, such as below the user 102 (e.g., rear projection).

The display medium 104 may generally comprise a passive and/or non-powered medium onto which content is projected. In some instances, the display medium 104 comprises a movable and/or handheld object. The display medium 104 may be formed to fit into the user's hand and include elements that provide information to accurately project an image onto the display medium 104 or to perform other actions, as discussed in further detail below. Further, in some instances the display medium 104 may comprise an object that is placed in the environment 100 that is not necessarily held by the user 102, such as a placemat located on a table or elsewhere.

As illustrated in FIG. 1, the ARFN node 106 comprises a computing device(s) 108, a projector(s) 110, and a sensor(s) 112 (e.g., camera, ranging system, etc.). Some or the all of the computing device(s) 108 may reside within a housing of the ARFN node 106 or may reside at another location that is operatively connected to the ARFN node 106. The computing device(s) 108 comprises a processor(s) 114, an input/output interface 116, and storage media 118. The processor(s) 114 may be configured to execute instructions that may be stored in the storage media 118 or in other storage media accessible to the processor(s) 114.

The input/output interface 116, meanwhile, may be configured to couple the computing device(s) 108 to other components of the ARFN node 106, such as the projector(s) 110, the sensor(s) 112, other ARFN nodes (such as in other environments or in the environment 100), other computing devices, network communication devices (such as modems, routers, and wireless transmitters), and so forth. The coupling between the computing device(s) 108 and other devices may be via wire, fiber optic cable, wireless connection, or the like. The sensor(s) 112 may include, in various embodiments, cameras (motion and/or still cameras), audio sensors such as microphones, ultrasound transducers, heat sensors, motion detectors (including infrared imaging devices), depth sensing cameras, weight sensors, touch sensors, tactile output devices, olfactory sensors, temperature sensors, humidity sensors, and pressure sensors. Other sensor types may be utilized without departing from the scope of the present disclosure.

The storage media 118, meanwhile, may include tangible computer-readable media ("TCRM"). The TCRM may be any available physical media accessible by a computing device to implement the instructions stored thereon. TCRM may include, but is not limited to, random access memory ("RAM"), read-only memory ("ROM"), electrically erasable programmable read-only memory ("EEPROM"), flash memory, or other memory technology, compact disk read-only memory ("CD-ROM"), digital versatile disks ("DVD") or other optical disk storage, magnetic cassettes, magnetic tape, magnetic disk storage or other magnetic storage devices, or any other tangible medium which can be used to store the desired information and which can be accessed by the computing device(s) 108. The storage media 118 may reside within a housing of the ARFN 106, on one or more storage devices accessible on a local network, on cloud storage accessible via a wide area network, or in any other accessible location. As defined herein, TCRM does not include communication media, such as modulated data signals and carrier waves.

The storage media 118 may store several modules, such as instructions, data stores, and so forth that are configured to execute on the processor(s) 114. For instance, the storage media 118 may store a determination component 120, a projection module 122, a tilt component 124, and a keystone correction component 126. The storage media 118 may also store additional modules and data, such as an operating system, an interface module, or other modules, which may be configured to implement various different functionality of the ARFN 106.

The operating system may be configured to manage hardware and services within and coupled to the computing device(s) 108 for the benefit of other modules. The interface module, meanwhile, may be configured to receive and interpret commands received from users within the environment 100. For instance, the interface module may analyze and parse images captured by one or more cameras of the sensor(s) 112 to identify users within the environment 100 and to identify gestures made by users within the environment 100, such as gesture commands to project display content. In other instances, the interface module identifies commands audibly issued by users within the environment and captured by one or more microphones of the sensor(s) 112. In still other instances, the interface module allows users to interface and interact with the ARFN node 106 in any way, such as via physical controls, and the like.

In various embodiments, the determination component 120 may detect the display medium 104 within the environment 100 and determine a distance and an angle of the display medium 104. For example, the determination component 120 may analyze information (e.g., an image) provided by the sensor(s) 112 (e.g., depth sensing camera) about the environment 100 and identify the display medium 104 within the environment 100. When, for example, the display medium 104 includes a marker (e.g., digital watermark or infrared reflector), the determination component 120 may also determine a position or orientation of the display medium 104 from the marker. For example, if the marker is positioned in a predetermined pattern or at a predetermined location on the display medium 104 that is known by the ARFN 106, the ARFN 106 may determine, or adjust a previously determined, position or orientation of the display medium 104.

The determination component 120 may also detect the display medium 104 using other mechanisms, such as time-of-flight (TOF), structured light, or interpolating, that take as input information (e.g., an image) provided by the sensor(s) 112 (e.g., depth sensing camera) about the environment 100. Once the determination component 120 has detected the display medium, the determination component 120 may determine the distance of the display medium 104 from the ARFN 106 and determine an angle of the display medium 104 with respect to an optical axis between the display medium 104 and the ARFN 106. In some embodiments, the determination component 120 may determine the distance and/or angle using the same techniques (e.g., TOF, structured light, interpolation, etc.) used to detect the display medium 104. Upon determining that a distance or angle of the display medium 104 has changed from a previously known distance or angle, the determination component 120 may invoke the projection module 122 to accommodate the change. Also, in some embodiments, the determination component 120 may perform the detecting and/or determining periodically or continuously. If periodically, the determination component 120 may utilize a history of motion of the display medium 104 to determine the magnitude of the period.

In various embodiments, the projection module 122 may manipulate the projected image so that it appears correctly on the display medium 104. For example, the projection module 122 may vary the size, location, orientation, and/or aspect ratio of the projected image. Further, in some instances the projection module 122 may utilize information about a location/pattern of one or more markers on the display medium 104 and/or information (e.g., characteristic information) from the one or more markers to project content, adjust parameters/setting of the ARFN 106, track the display medium 104, and so on.

In further embodiments, in response to being invoked by the determination component 120, the projection module 122 may perform a sequence of actions to accommodate movement or tilt of the display medium 104. First, the projection module 122 may cause adjustment to a zoom of a lens of the projector(s) 110. The zoom may be adjusted to fit a display screen size of the display medium 104.

Next, the projection module 122 may invoke the tilt component 124 to adjust an angle of at least a component of the projector(s) 110 with respect to its prior position. The component that is angularly adjusted may be a lens of projector(s) 110 or an imager and light engine of the projector(s) 110. The angular adjustment may be in an opposite direction from an angular tilt of the display medium 104, and the size of the angle created by the adjustment may be relatively small when compared to the determined angle of the display medium 104 with respect to the optical axis. For example, the determined angle of the display medium 104 may be forty-five degrees and the angle created by the adjustment may be one-point-five degrees. The adjustment may be based on one or both of the determined distance and/or the determined angle of the display medium 104. The tilt component 124 may calculate the adjustment based on the formula $\operatorname{Tan}(A)=(-1/M)\operatorname{Tan}(B)$, wherein A is the angle created by the adjustment, M is an image magnification of the projector(s) 110, and B is the determined angle of the display medium 104. In some embodiments, the adjustment may be effectuated through use of actuators located between the lens and other components of the projector(s) 110 (i.e., the imager and light engine of the projector(s) 110. Motion of these actuators causes the angular adjustment of the component of the projector(s) 110 with respect to its previous position.

The projection module 122 may then readjust the zoom of a lens of the projector(s) 110 to accommodate any change in distance caused by the angular adjustment of the component of the projector(s) 110.

In some embodiments, the projection module 122 may then invoke the keystone correction component 126 to use techniques such as keystone correction to correct the appearance of the projected image in situations where the projection source is not aligned with the display medium 104. The correction may be based on one or both of the determined angle or the adjusted angle and may include stretching the to-be-compressed pixels in the image and compressing the to-be-stretched pixels in the image. For example, the projected image may be intentionally distorted to account for a non-perpendicular alignment of the display medium 104 with respect to the projection source (i.e., the ARFN 106). In some situations, the projected image may also be distorted to correct for irregularities or non-planar characteristics of the display medium 104.

In various embodiments, the projection module 122 may also cause the projector(s) 110 to project light onto the display medium 104. The projector(s) 110 may project the light before, during, and/or after the dynamic accommodation of the detected change in distance and/or angle of the display medium 104.

As noted above, the storage media 118 may also include other modules, which may be configured to implement various different functionality of the ARFN 106. For example, the storage media 118 may include one or more modules to utilize other information provided by a marker, such as information for authenticating a user, information for accessing particular content, and so on.

Example ARFN

Figure 2:
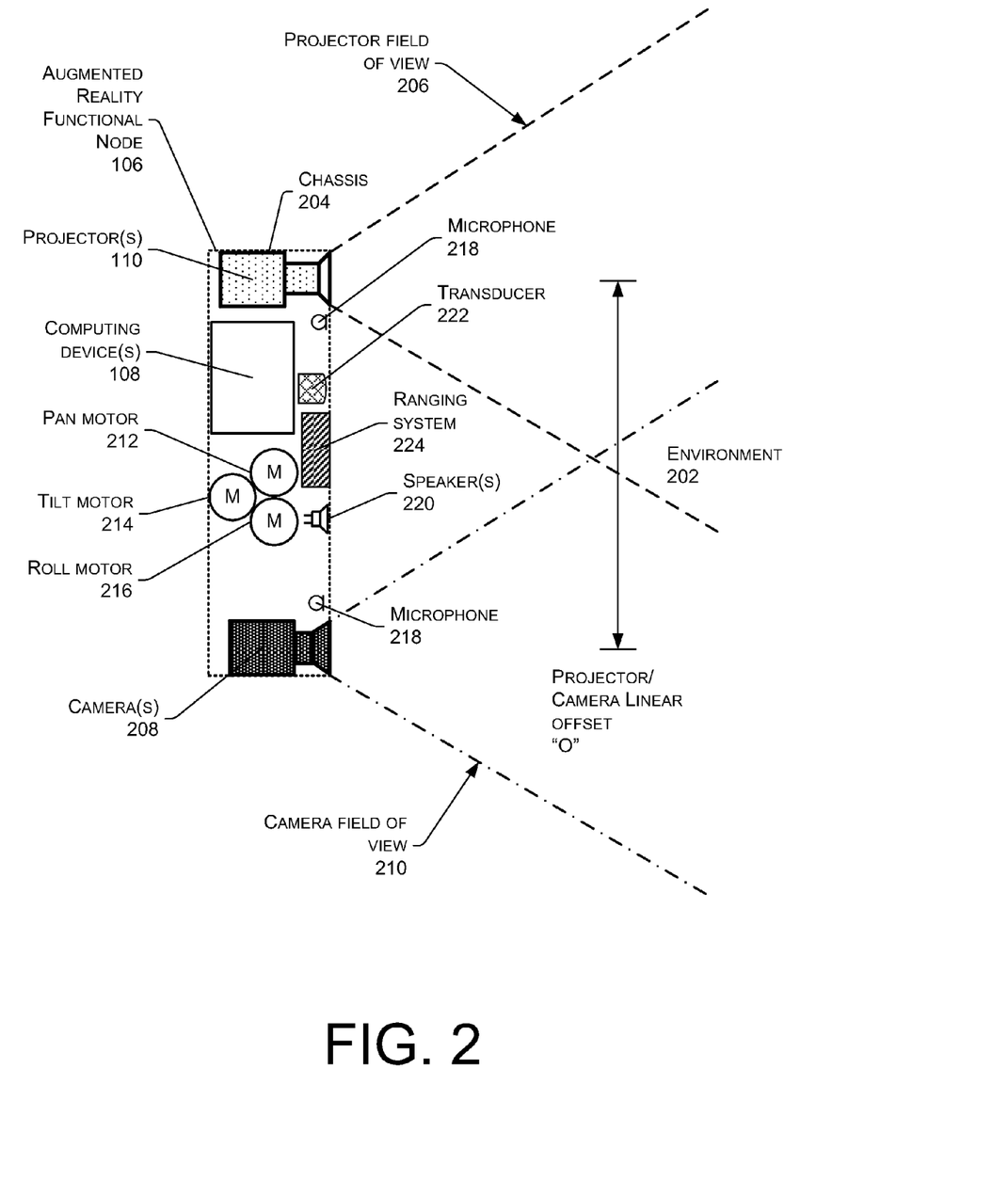
FIG. 2 shows additional details of the example ARFN of FIG. 1.

FIG. 2 shows additional details of the example ARFN 106 of FIG. 1. The ARFN node 106 is configured to scan at least a portion of an environment 202 and the objects therein to detect a display medium 104. The ARFN node 106 may also be configured to provide augmented reality output, such as images, sounds, and so forth.

A chassis 204 holds the components of the ARFN node 106. The projector(s) 110 may be disposed within the chassis 204 and may be configured to generate and project light and/or images into the environment 202. These images may be visible light images perceptible to a user, visible light images imperceptible to the user, images with non-visible light, or a combination thereof. This projector(s) 110 may be implemented with any number of technologies capable of generating an image and projecting that image onto a surface within the environment 202. Suitable technologies include a digital micromirror device (DMD), liquid crystal on silicon display (LCOS), liquid crystal display, 3LCD, and so forth. The projector(s) 110 has a projector field of view 206 which describes a particular solid angle. The projector field of view 206 may vary according to changes in the configuration of the projector(s) 110. For example, the projector field of view 206 may narrow upon application of an optical zoom to the projector(s) 110.

A camera(s) 208 may also be disposed within the chassis 204. The camera(s) 208 is configured to image the environment 202 in visible light wavelengths, non-visible light wavelengths, or both. The camera(s) 208 has a camera field of view 210 that describes a particular solid angle. The camera field of view 210 may vary according to changes in the configuration of the camera(s) 208. For example, an optical zoom of the camera(s) 208 may narrow the camera field of view 210.

In some implementations, a plurality of cameras 208 may be used. For instance, one embodiment of the ARFN node 106 may include a three-dimensional (3D), infrared (IR) camera and a red-green-blue (RGB) camera. The 3D, IR camera may be configured to capture information for detecting depths of objects within the environment 202, while the RGB camera may be configured to detect edges of objects by identifying changes in color within the environment 202. In some instances, a single camera may be configured to perform these functions.

The chassis 204 may be mounted with a fixed orientation, or may be coupled via an actuator to a fixture such that the chassis 204 may move. Actuators may include piezoelectric actuators, motors, linear actuators, and other devices configured to displace or move the chassis 204 or components therein such as the projector(s) 110 and/or the camera(s) 208. For example, in one implementation the actuator may comprise a pan motor 212, a tilt motor 214, and so forth. The pan motor 212 is configured to rotate the chassis 204 in a yawing motion. The tilt motor 214, meanwhile, is configured to change the pitch of the chassis 204. In some instances, the ARFN 106 additionally or alternatively includes a roll motor 216, which allows the chassis 204 to move in a rolling motion. By panning, tilting, and/or rolling the chassis 204, different views of the environment 202 may be acquired.

One or more microphones 218 may be disposed within the chassis 204, or elsewhere within the environment 202. The one or more microphones 218 may be used to acquire input from an entity (e.g., a user), for echolocation, location determination of a sound, or to otherwise aid in the characterization of and receipt of input from the environment 202. In some instances, a user may use voice commands to control various aspects of the ARFN node 106. A speaker(s) 220 may also be present to provide audible output, such as the output from a text-to-speech module or playback from pre-recorded audio.

A transducer 222 may be present within the ARFN node 106, or elsewhere within the environment 202, and may be configured to detect and/or generate inaudible signals, such as infrasound or ultrasound. These inaudible signals may be used to provide for signaling between accessory devices and the ARFN node 106.

The ARFN node 106 may also include a ranging system 224. The ranging system 224 is configured to provide distance information from the ARFN node 106 to a scanned entity, object (e.g., display medium), or set of objects. The ranging system 224 may comprise and/or use radar, light detection and ranging (LIDAR), ultrasonic ranging, stereoscopic ranging, structured light analysis, time-of-flight observations (e.g., measuring time-of-flight round trip for pixels sensed at a camera), and so forth. In structured light analysis a projector may project a structured light pattern onto the scene within the environment 100, and a camera may capture an image of the reflected light pattern. Deformation in the reflected pattern, due to a lateral displacement between the projector and the camera, may be analyzed by the ARFN 106 to determine depths or distances corresponding to different points, areas, or pixels within the environment 100. In some implementations the transducer 222, the microphones 218, the speaker(s) 220, or a combination thereof may be configured to use echolocation or echo-ranging to determine distance and spatial characteristics of an entity or object.

In this illustration, the computing device(s) 108 is shown within the chassis 204. However, in other implementations all or a portion of the computing device(s) 108 may be disposed in another location and coupled to the ARFN node 106. This coupling may occur via wire, fiber optic cable, wirelessly, or a combination thereof. Furthermore, additional resources external to the ARFN node 106 may be accessed, such as resources in another ARFN node 106 accessible via a local area network, cloud resources accessible via a wide area network connection, or a combination thereof.

Also shown in this illustration is a projector/camera linear offset designated "O". This is a linear distance between the projector(s) 110 and the camera(s) 208. Placement of the projector(s) 110 and the camera(s) 208 at distance "O" from one another may aid in the recovery of structured or other light data from the environment. The known projector/camera linear offset "O" may also be used to calculate distances, dimensioning, and otherwise aid in the characterization of entities or objects within the environment 202. In other implementations the relative angle and size of the projector field of view 206 and camera field of view 210 may vary. Also, the angle of the projector(s) 110 and the camera(s) 208 relative to the chassis 204 may vary.

In other implementations, the components of the ARFN node 106 may be distributed in one or more locations within the environment 100. As mentioned above, the microphones 218 and the speaker(s) 220 may be distributed throughout the environment. The projector(s) 110 and the camera(s) 208 may also be located in separate chasses 204. The ARFN node 106 may also include discrete portable signaling devices used by entities to issue command attention inputs. For example, these may be acoustic clickers (audible or ultrasonic), electronic signaling devices such as infrared emitters, radio transmitters, and so forth.

The ARFN node 106 is shown in FIG. 2 with various sensors, but other sensors may be located either within or external to the chassis 204. The sensors may include, in various embodiments, cameras (motion and/or still cameras), audio sensors such as microphones, ultrasound transducers, heat sensors, motion detectors (including infrared imaging devices), depth sensing cameras, weight sensors, touch sensors, tactile output devices, olfactory sensors, temperature sensors, humidity sensors, pressure sensors, and so forth.

Example Adjustments to Angles of Projector Components

Figure 3:
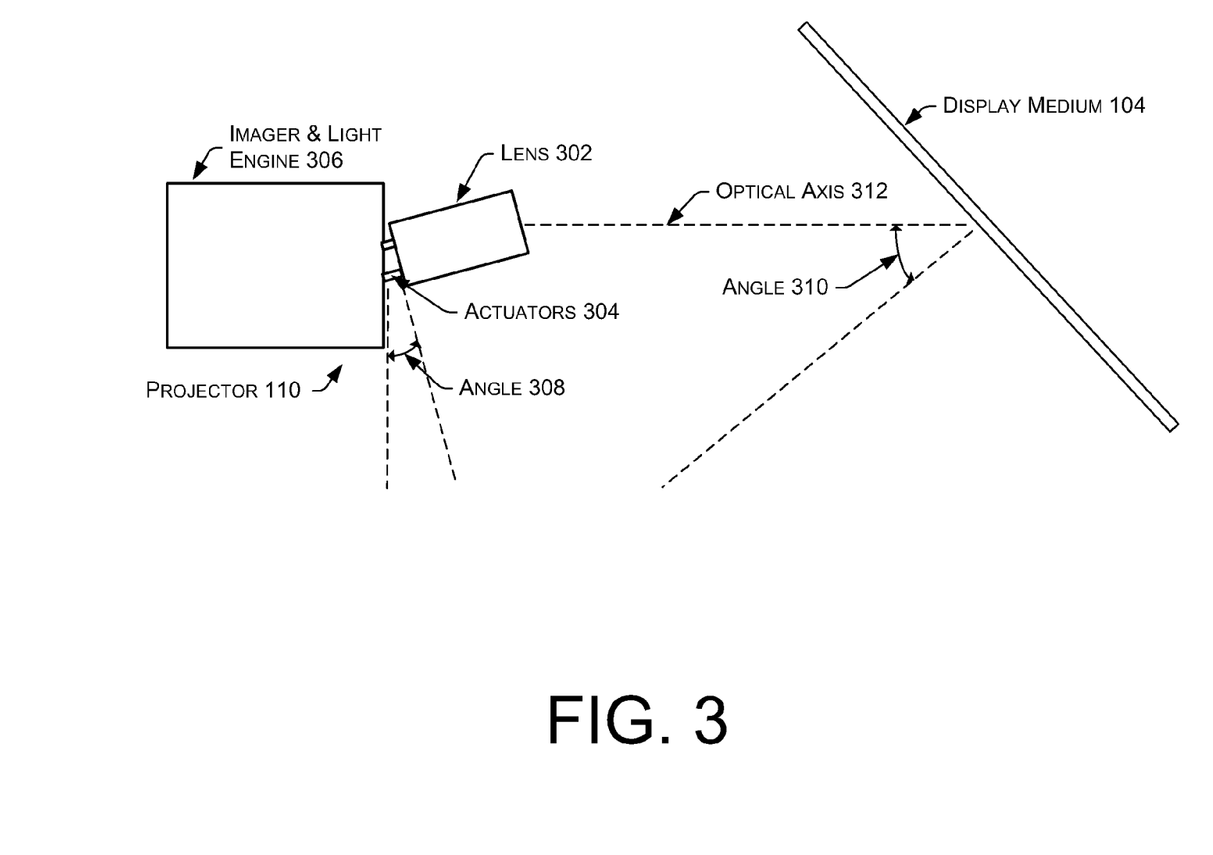
FIG. 3 illustrates an example projector of an ARFN with a lens configured have its position angularly adjusted to dynamically accommodate changes in tilt and/or distance of a display medium.

FIG. 3 illustrates an example projector 110 of an ARFN 106 with a lens configured have its position angularly adjusted to dynamically accommodate changes in tilt and/or distance of a display medium 104. As illustrated, a projector 110 may include a lens 302 capable of being adjusted in an angular fashion with respect to its previous position and with respect to the imager and light engine 306 of the projector 110. The lens 302 may be any sort of lens, such as a lens configurable to having multiple different zoom levels in which different levels of light are emitted through an aperture.

The lens 302 is physically coupled to other components of the projector 110, such as the imager and light engine 306, and may include a plurality of actuators 304 located between the lens and the other components of the projector 110. The actuators 304 may be physically coupled to one or both of the lens 302 and the other components of the projector 110. Like the actuators of the ARFN 106 described above, the actuators 304 may include piezoelectric actuators, motors, linear actuators, and other devices configured to displace or move the lens 302.

In various embodiments, the angular movement of the lens 302 creates an angle 308 with respect to a previous position of the lens 302. The angle 308 may be a relatively small angle, especially with respect to the angle 310 made by the display medium 104 with respect to an optical axis 312 between the projector 110 and a projection center of the display medium 104. For example, the angle 308 may represent a maximum range of motion of three degrees. Such a maximum motion of three degrees may accommodate a maximum angle 310 of sixty degrees. Such a small angle 308 may accommodate a large angle 310 due to the effects of image magnification. The projection center of the display medium 104, meanwhile, may comprise the point of the display medium that the optical axis of the projector 110 is pointing out, which in some instances may be the center of the display medium itself.

The angle 310 represents the angle between a line orthogonal to the surface of the display medium 104 and the optical axis 312 between the projection source/projector 110 and the projection center of the display medium 104. This angle is also referred to herein at the "tilt" or "angle" of the display medium 104. In circumstances where the display medium 104 is handheld, its position and tilt may change frequently in three-dimensional space, responsive to movements of a user holding the display medium 104. Responsive to this changing angle 310, the ARFN 106 may cause the actuators 304 to angularly adjust the position of the lens 302, causing the angle 308 to fluctuate with the angle 310.

Figure 4:
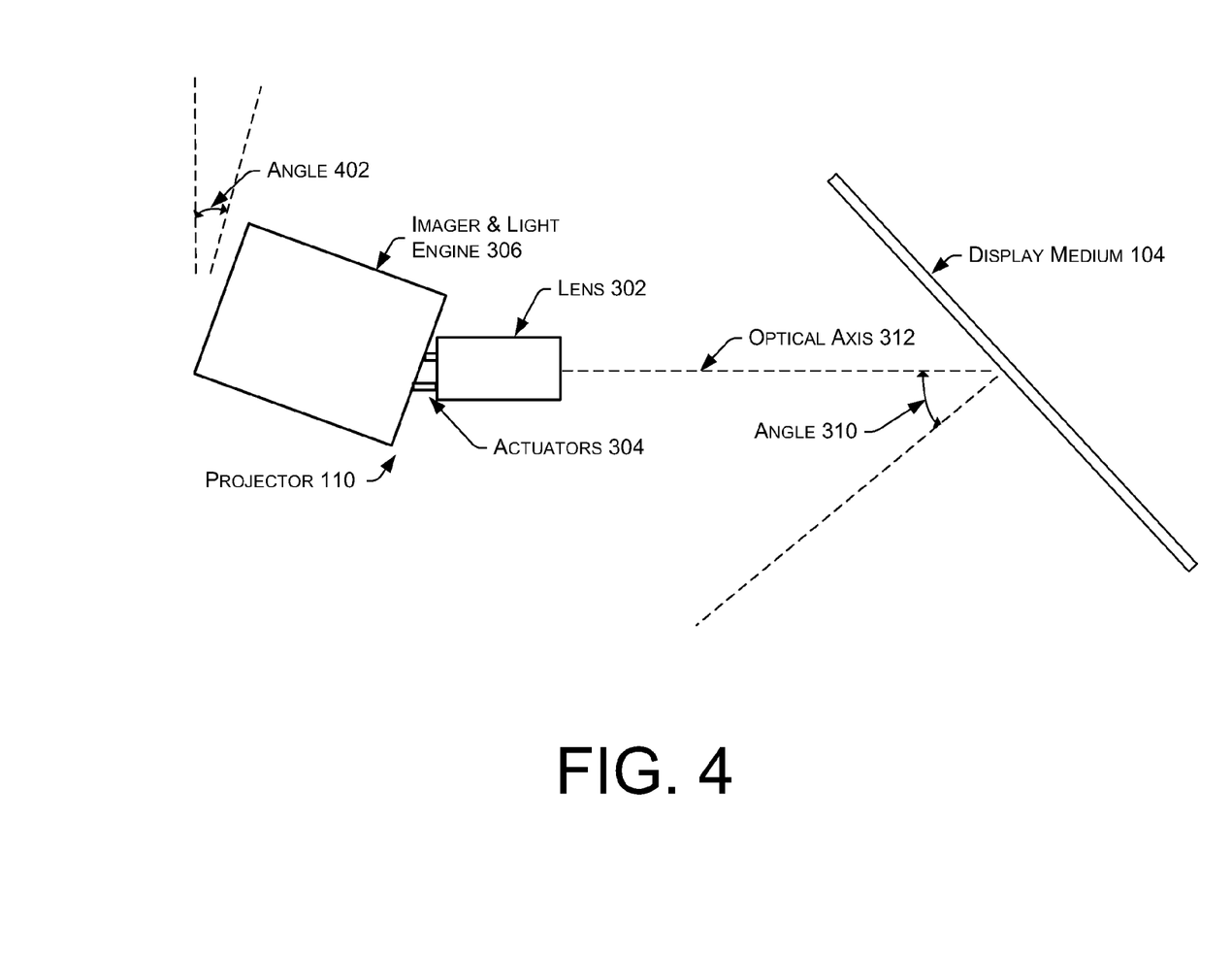
FIG. 4 illustrates an example projector of an ARFN, the imager and light engine of the projector being configured to have their position angularly adjusted to dynamically accommodate changes in tilt and/or distance of a display medium.

FIG. 4 illustrates an example projector of an ARFN, the imager and light engine projector being configured to have their position angularly adjusted to dynamically accommodate changes in tilt and/or distance of a display medium. As with the lens 302 and actuators 304 of FIG. 3, the angular movement of the imager and light engine 306 using the actuators 304 creates an angle 402 that may be substantially the same as the angle 308. The angle 402 may also be relatively small with respect to the angle 310, and may also change responsive to changes to the angle 310 (by, e.g., movements of the actuators 304).

Additionally, the ARFN 106 may, in some embodiments, move the camera(s) 208 in an angular fashion to maintain the projector/camera linear offset designated "O"—shown in FIG. 2 and described above.

Example Keystone Corrections

Figure 5:
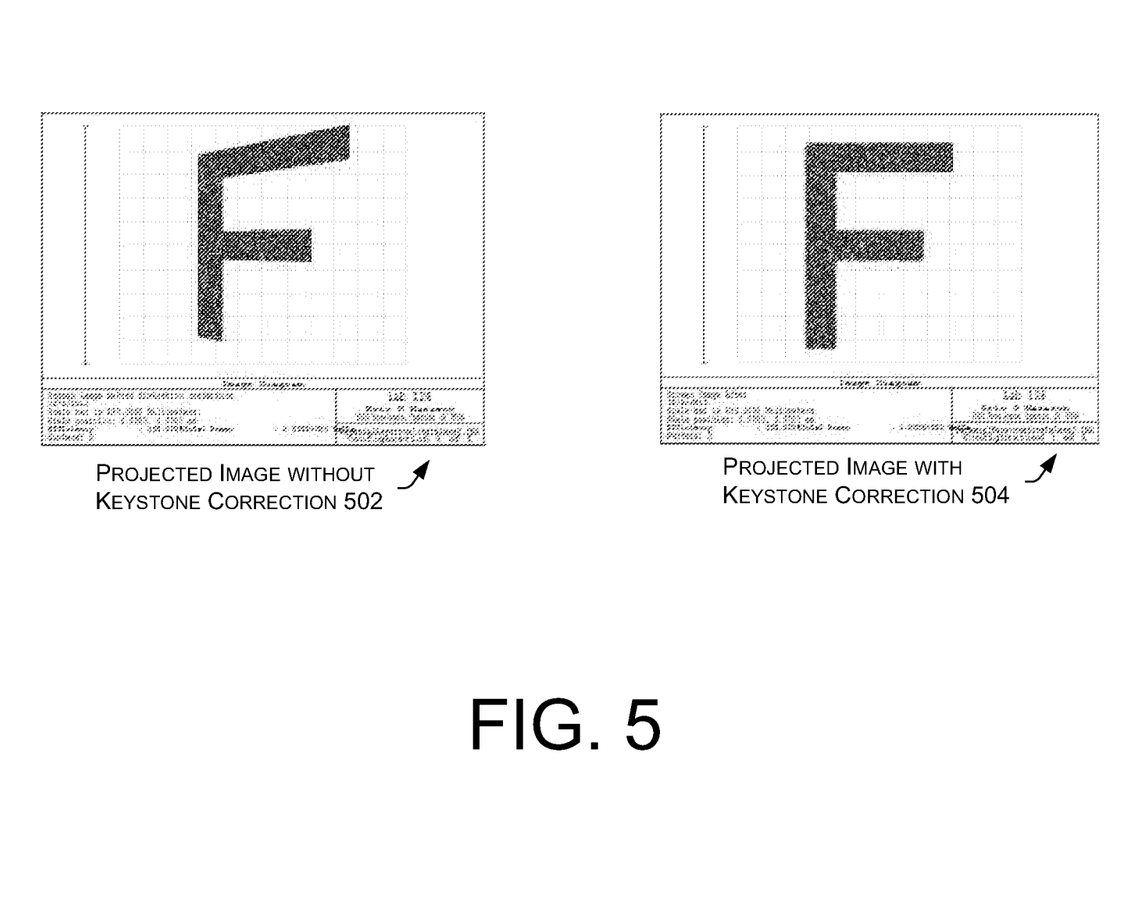
FIG. 5 illustrates examples of images before and after application of keystone correction to stretch to-be-compressed pixels in an image and to compress to-be-stretched pixels in an image.

FIG. 5 illustrates examples of images before and after application of keystone correction to stretch to-be-compressed pixels in an image and to compress to-be-stretched pixels in an image. As shown in 502, if the projector 110 were to project an image onto the display medium 104 without any keystone correction, the resulting image would appear distorted, with some pixels compressed and others stretched. Such keystone distortions are a result of the tilt of the display medium 104 with respect to the optical axis 312 and are not corrected by the angular adjustments made with respect to a position of at least a component of the projector 110. Such angular adjustments, described in detail, improve focus but do not correct keystone distortions.

In various embodiments, a keystone correction component 126 of the ARFN 106 may, however, perform keystone correction to counter the anticipated keystone distortions shown in 502. The process of keystone correction is described above in detail. To-be-compressed pixels of an image are stretched and to-be-stretched pixels of the image are compressed. A resulting keystone corrected image, when projected, results in the image shown at 504 being displayed on the display medium 104.

Example Process

Figure 6:
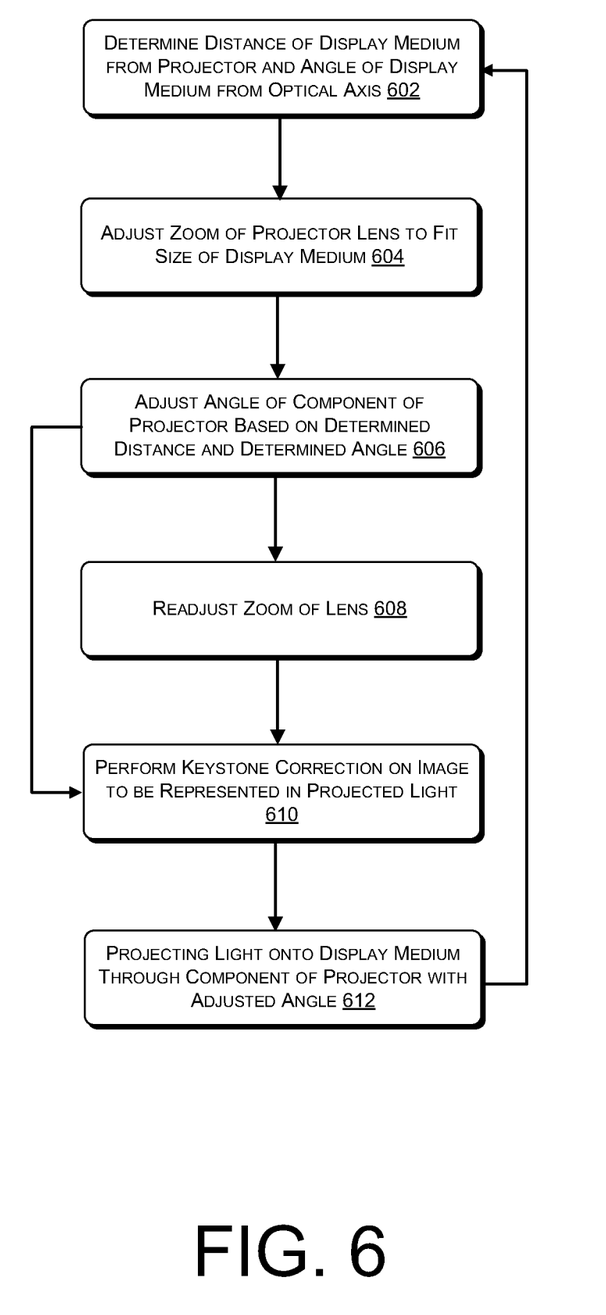
FIG. 6 illustrates a process for dynamically accommodating changes in tilt and/or distance of a display medium by angularly adjusting a position of at least a component of a projector of the ARFN.

FIG. 6 illustrates a process for dynamically accommodating changes in tilt and/or distance of a display medium by angularly adjusting a position of at least a component of a projector. This process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

The process includes, at 602, determining, by an ARFN, a distance of a projector of the ARFN from a projection center of a display medium. Also at 502, the ARFN may determine an angle of the display medium with respect to an optical axis between the projector and the display medium. The ARFN may determine one or both of the distance or angle using one or more of time-of-flight (TOF), structured light, or interpolating.

At 604, the ARFN may adjust a zoom of a lens of the projector to fit a display screen size of the display medium.

At 606, the ARFN may adjust an angle of at least one component of the projector based on one or both of the determined distance and the determined angle. The at least one component of the projector may be a lens of the projector or an imager and a light engine of the projector. The angle may be adjusted with respect to a previous position of the at least one component of the projector. Also, the ARFN may calculate the adjustment to the angle of the lens using a formula $\mathrm{Tan}(A) = (-1/M)\mathrm{Tan}(B)$, wherein A is the angle of the at least one component of the projector, M is an image magnification of the projector, and B is the determined angle of the display medium. To effectuate the adjustment, the ARFN may adjust actuators of the projector, the actuators being located between the lens and other components of projector. The actuators may be physically coupled to at least one of the lens and the other components and configured to cause relative angular motion of the lens with respect to the other components.

At 608, the ARFN may readjust the zoom of the lens responsive to a change in the determined distance caused by the adjustment of the angle of the at least one component of the projector.

At 610, the ARFN may correct an anticipated keystone distortion of an image to be projected by the projector, the correcting being based at least in part on one or both of the determined angle or the adjusted angle and including stretching the to-be-compressed pixels in the image and compressing the to-be-stretched pixels in the image.

At 612, the projector of the ARFN may project light onto the display medium through the at least one component of the projector with the adjusted angle. The ARFN may then repeat the operations shown at 602-612 either periodically or continuously. In some embodiments, the repeating is performed periodically, and the period is adjusted based on a history of motion of the display medium.

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. An apparatus comprising:
a processor;
a projector including a lens, an imager, and a light engine;
a determination component operable by the processor to determine a distance of a projection center of a display medium from the lens and an angle of the display medium with respect to an optical axis of the projector; and
a tilt component operable by the processor to calculate an adjustment to an angle of the lens with respect to the imager and the light engine, the calculating based at least in part on the distance and the angle of the display medium with respect to the optical axis, and to instruct the projector to adjust the angle of the lens with respect to the imager and the light engine; and
wherein the projector is operable to adjust the angle of the lens with respect to the imager and the light engine based at least in part on the calculated adjustment and to project light onto the display medium.

2. The apparatus of claim 1, further comprising an actuator located between the lens and a component of the projector, the component including the imager and the light engine and the actuator being coupled to at least one of the lens or the component and configured to cause the adjustment to the angle of the lens with respect to the imager and the light engine.

3. The apparatus of claim 1, wherein the projector is further operable to adjust a zoom so that the projected light fits a size of the display medium, the adjusting being based on at least one of the distance or the determined angle of the display medium.

4. The apparatus of claim 3, wherein the projector is further operable to readjust the zoom after adjusting the angle of the lens with respect to the imager and the light engine.

5. The apparatus of claim 1, wherein the tilt component is further operable to calculate the adjustment to the angle of the lens using a formula Tan(A)=(−1/M)Tan(B), wherein A is the angle of the lens with respect to the imager and the light engine, M is an image magnification of the projector, and B is the angle of the projection center of the display medium with respect to the lens.

6. The apparatus of claim 1, further comprising a keystone correction component operable to at least partially correct an anticipated keystone distortion of an image projected by the projector, the correcting being based at least in part on at least one of the angle of the projection center of the display medium with respect to the lens or the angle of the lens with respect to the imager and the light engine, the correcting also including both stretching a plurality of to-be-compressed pixels of the image and compressing a plurality of to-be-stretched pixels of the image.

7. A computer-implemented method comprising:
   determining an angle of a display medium with respect to an optical axis of a projector;
   adjusting an angle of at least one component of the projector with respect to another component of the projector based at least in part on the angle of the display medium with respect to the optical axis; and
   projecting light onto the display medium through the projector.

8. The method of claim 7, wherein the at least one component of the projector is one of a lens of the projector or an imager and a light engine of the projector, and the other component of the projector is the other of the lens or the imager and the light engine.

9. The method of claim 7, further comprising determining a distance from the projector to a projection center of the display medium.

10. The method of claim 9, wherein the distance or the angle of the display medium with respect to the optical axis is determined using one or more of time-of-flight (TOF) or structured light.

11. The method of claim 9, further comprising, prior to adjusting the angle of the at least one component of the projector with respect to the other component of the projector, adjusting a zoom of the projector so that the projected light fits a size of display medium based on at least one of the distance or the angle of the display medium with respect to the optical axis.

12. The method of claim 11, further comprising readjusting the zoom after adjusting the angle of the at least one component of the projector with respect to the other component of the projector.

13. The method of claim 7, further comprising calculating the adjustment to the angle of the at least one component of the projector with respect to the other component of the projector using a formula Tan(A)=(−1/M)Tan(B), wherein A is the angle of the at least one component of the projector with respect to the other component of the projector, M is an image magnification of the projector, and B is the angle of the display medium with respect to the optical axis.

14. The method of claim 7, further comprising, prior to performing the projecting, correcting an anticipated keystone distortion of an image projected by the projector, the correcting being based at least in part on one or both of the angle of the display medium with respect to the optical axis or the angle of the at least one component of the projector with respect to the other component of the projector.

15. The method of claim 14, wherein the correcting comprises stretching a plurality of to-be-compressed pixels of the image and compressing a plurality of to-be-stretched pixels of the image.

16. The method of claim 7, further comprising repeating the determining, the adjusting, and the projecting periodically, wherein a period is adjusted based on a history of motion of the display medium.

17. The method of claim 7, wherein the display medium is a moveable, non-powered handheld device.

18. One or more tangible computer-readable media storing computer-executable instructions configured to program a computing device to perform operations comprising:
   determining an angle of a display medium with respect to an optical axis of a projector;
   determining a distance from a projection center of the display medium to the projector;
   causing adjustment to an angle of at least one component of the projector with respect to another component of the projector based at least in part on the angle of the display medium with respect to the optical axis and the distance; and
   causing the projector to project light onto the display medium.

19. The one or more tangible computer-readable media of claim 18, wherein the operations further comprise, prior to adjusting the angle of the at least one component of the projector with respect to the other component of the projector, adjusting a zoom of the projector so that the projected light fits a size of display medium based on at least one of the distance or the angle of the display medium with respect to the optical axis.

20. The one or more tangible computer-readable media of claim 19, wherein the operations further comprise readjusting the zoom after adjusting the angle of the at least one component of the projector with respect to the other component of the projector.

21. The one or more tangible computer-readable media of claim 18, wherein the operations further comprise calculating the adjustment to the angle of the at least one component of the projector with respect to the other component of the projector using a formula Tan(A)=(−1/M)Tan(B), wherein A is the angle of the at least one component of the projector with respect to the other component of the projector, M is an image magnification of the projector, and B is the angle of the display medium with respect to the optical axis.

22. The one or more tangible computer-readable media of claim 18, wherein the operations further comprise, prior to performing the projecting, correcting an anticipated keystone distortion of an image projected by the projector, the correcting being based at least in part on at least one of the angle of the display medium with respect to the optical axis or the angle of the at least one component of the projector with respect to the other component of the projector.

23. The one or more tangible computer-readable media of claim 22, wherein the correcting comprises stretching a plurality of to-be-compressed pixels of the image and compressing a plurality of to-be-stretched pixels of the image.

* * * * *